(12) United States Patent
Greenwell et al.

(10) Patent No.: US 6,202,392 B1
(45) Date of Patent: Mar. 20, 2001

(54) FLEXIBLE TISSUE HANDLING APPARATUS

(75) Inventors: J. Daniel Greenwell, Florence; Peter D. Schwartz, Verona, both of KY (US); Ted K. Lemmon, Milford, OH (US)

(73) Assignee: R. A. Jones & Co. Inc.

( * ) Notice: Subject to any disclaimer, the term of this patent is extended or adjusted under 35 U.S.C. 154(b) by 0 days.

(21) Appl. No.: 09/394,594

(22) Filed: Sep. 13, 1999

(51) Int. Cl.[7] .................................................. B65B 43/24
(52) U.S. Cl. .......................... 53/566; 53/544; 53/258; 53/255; 53/117
(58) Field of Search ........................... 53/566, 544, 258, 53/143, 255, 579, 120, 116, 117, 167, 252; 198/411

(56) References Cited

U.S. PATENT DOCUMENTS

| | | | |
|---|---|---|---|
| 3,502,194 | * | 3/1970 | Perry ...................................... 198/411 |
| 3,651,976 | * | 3/1972 | Nystrand et al. ........................ 53/120 |
| 3,919,827 | * | 11/1975 | Larson et al. ............................ 53/120 |
| 3,958,688 | * | 5/1976 | Sterling .................................. 198/411 |
| 4,967,899 | * | 11/1990 | Newsome .............................. 198/411 |
| 5,175,976 | * | 1/1993 | Petry et al. .............................. 53/566 |
| 5,185,984 | * | 2/1993 | Tisma ...................................... 53/566 |
| 5,657,610 | * | 8/1997 | Dietrich et al. ......................... 53/566 |

* cited by examiner

*Primary Examiner*—Stephen F. Gerrity
*Assistant Examiner*—Sam Tawfik
(74) *Attorney, Agent, or Firm*—Wood, Herron & Evans, LLP

(57) ABSTRACT

Tissue clips are placed on the upper level of bi-level product buckets, with the length of the tissue clips in the machine direction. The lower level of the product bucket is comprised of a full-width transverse channel whose width is greater than the width of the tissue clips but less the length of the tissue clips. To package flat packages of tissues, extensible pushers turn the tissue clips 90 degrees so they drop into the transverse channels. Subsequently flat overhead tamps descend and the tissue clips are pushed through guide buckets into the end of the flat-pack cartons. To package boutique packages of tissues, the extensible pushers are disengaged so the length of the tissue clips remain in the machine direction spanning the transverse channels. Subsequently, narrow tamps descend, pushing the center of the tissue clips into the transverse channels, forming the tissue clips into the beginning of a U-shape ready for pushing through guide buckets into the side of boutique cartons. Methods and apparatus are disclosed.

17 Claims, 10 Drawing Sheets

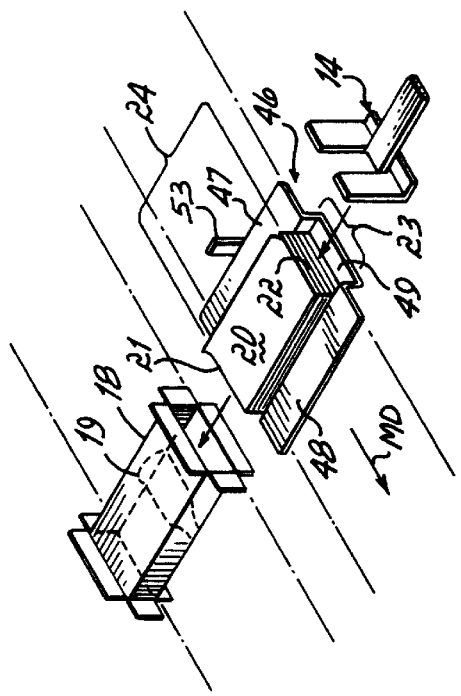
FIG. 1
FIG. 2
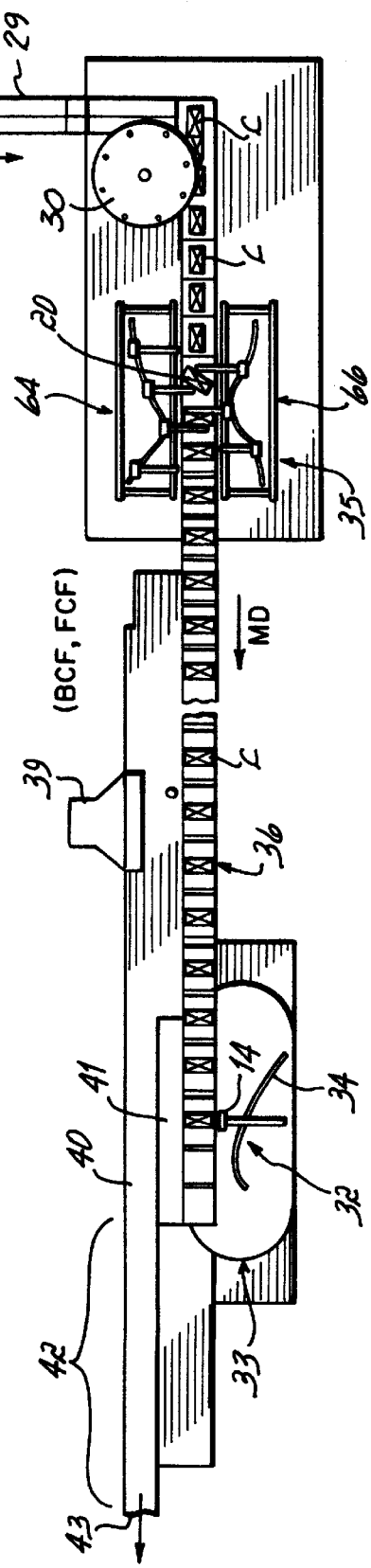
FIG. 3

FLEXIBLE TISSUE HANDLING APPARATUS

BACKGROUND OF THE INVENTION

This invention relates to handling items such as stacks or clips of facial tissues and more particularly to configuring such clips for cartoning such as for placement into particular cartons.

In the past, such tissues are produced in select count stacks or "clips" comprising one flat tissue lying atop another in an elongated flat shaped stack being generally longer than it is wide. This configuration is okay for flat shaped carton packaging; the clip is simply pushed endwise from a cartoner bucket into the box. Typically, the box has at least one major panel generally parallel with the tissues and an opening in the panel provides access for tissue removal for use. On the other hand, upright, cubic or boutique cartons are more confining. The clip must be bent into a U-shape and thusly configured, pushed sideways into the boutique carton which appears more like a cube than the rectangular shape of the flat carton. In these boutique cartons, a major panel adjacent the bend in the confined clip is provided with an opening for accessing the tissues for withdrawal and use.

In the past, when changing a product line or output from a flat carton to a boutique carton, there were two options. A first option was for the manufacturer to simply purchase two cartoning machines. One would handle a flat pack or cartoning process and another would handle a boutique or upright cartoning process. Of course, this involved the cost of an extra machine.

Alternately, if a single machine was used to produce filled flat cartons and boutique cartons, the machine would be stopped and many changeover parts added to reconfigure the machine to render it operable for properly configuring the clip for the new carton. This resulted in production downtime and significant expense for changeover parts.

More particularly, it will be appreciated that when filling flat cartons, flat clips are simply pushed longwise into the carton through an open end of the carton. End flaps are then closed to produce a finished carton or tissue box. When boutique or upright cartons are used, however, the clips are bent into a U-shape which is then pushed sideways into an open-sided boutique carton, which is then closed to produce a finished boutique carton or tissue box.

Generally, the clips in either case are received in individual buckets of a bucket conveyor, and, in appropriate configuration, are loaded into cartons moving along a machine direction, in phased relation to the buckets. A transfer guide bucket conveyor is typically interposed between the first mentioned buckets and the cartons for receiving and guiding the configured clip as it is pushed transversely from the bucket into the carton.

It will be appreciated from this description that the respective clips must be oriented in the buckets for transfer into the cartons in two different directions. For elongated flat clips, their elongated dimension should lie transversely across the buckets, perpendicular to the machine direction of the bucket conveyor, for endwise motion transversely across the bucket, toward and into the flat cartons. For boutique configured, U-shape clips, which are moved sideways transversely off the buckets into the boutique cartons, their elongated dimension should lie parallel to the machine direction of the bucket conveyor as they are moved into the cartoner. Thus, the clips for flat cartons are oriented longitudinally at 90 degrees to the longitudinal position of the clips configured for boutique cartons.

Accordingly, any machine which is changed over to handle both type clips or cartons must be provided with a variety of parts to produce proper clip orientation and handling, essentially for conveying boutique configured clips with their elongated dimension parallel to the machine direction or flat configured clips at 90 degrees or perpendicular to the machine direction.

Accordingly, it has been one objective of the invention to provide a single, improved tissue handling apparatus and methods for tissue clips of varied configuration.

It has been a further objective of the invention to produce an improved handling apparatus and methods for tissue cartoning which handles both flat and boutique configured clips, but without extensive downtime and with a minimum number of change parts.

It has been a further objective of the invention to provide improved apparatus and methods for turning tissue clips for proper orientation for insertion into flat cartons and for selectively transporting tissue clips for loading into boutique cartons.

It has been a further objective of the invention to provide improved methods and apparatus for handling differently configured tissue clips on the same handling apparatus with only minimal changeover parts.

BRIEF SUMMARY OF THE INVENTION

To these ends, a preferred embodiment of the invention contemplates use of a bucket conveyor wherein the buckets have a floor and a transverse channel disposed in the floor. The channel has a length which extends in a direction across the floor and a width which is wider than the side-to-side width of the clips, but shorter than the length of the clips. According to the invention, all clips of whatever final configuration they may assume, are fed into the buckets with their elongated length oriented in a downstream direction parallel to the machine direction of the buckets. In this position, the clips span over the transverse channels in the respective buckets.

When it is desired to fill flat cartons with a flat clip, the clip is turned so that it extends across the bucket parallel to the transverse channel. This turning causes the flat clip to fall into the channel. From there, it can then be pushed transversely and endwise into a flat carton. When it is desired to fill a boutique or upright carton, the clip is maintained in its original position spanning the channel, its length being longer than the channel is wide. A tamp or confiner is moved in over the clip and pushes an intermediate portion of the clip down into the channel into a U-shaped configuration with a central portion of the clip at least partially down in the channels and outer ends contacted by the bucket floor or the channel walls and being directed upwardly. From this position, the U-shaped clip may now be pushed transversely and sideways out of the bucket and into a boutique or upright carton.

In both cases, a preferred embodiment of the invention provides a transfer guide bucket conveyor between the transport bucket and the carton to confine or guide the traversing clip into a carton in appropriate configuration.

One difficultly in accomplishing the turning process of the flat clip so it falls into the channel is potential loss of control, allowing the clip to scramble, twist or otherwise diverge from its uniform stacked configuration. In order to turn and drop the clip and maintain it in appropriate alignment at the same time, the preferred embodiment of the invention contemplates two offset opposed pushers engaging side edges of the flat clip at offset longitudinal positions to carefully turn it and allow it to drop. The pushers may comprise plates extendable transversely into the buckets from opposite sides, and into and above the transverse channels. Ends of the pushers engage and twist or turn the clip. Once in alignment with the channel, the clips are aligned with internal facing sides of the pushers which configure and guide the clip through its fall into the channel.

Thereafter, the pushers are retracted and the clips are conveyed downstream to a cartoner where they can be pushed endwise transversely across the buckets along the channels and into a flat carton. The channels are slightly wider than the side-to-side width of the clip so there is room for each pusher between a respective side of the clip and the adjacent channel wall.

The pushers thus control the flat clip edges, maintaining alignment of the tissues in the clip as they are turned into final position and drop into the channel for end loading. After turning and aligning the clip, the pushers are retracted and the buckets continue downstream in a machine direction, maintaining the position or condition of the clips for loading into cartons.

The pushers are preferably independently carried on barrel loader-like apparatus disposed on opposite sides of the bucket conveyor and are, of course, either stopped or disabled when it is desired to configure the clips for loading boutique cartons where the clips are not turned. No change parts are required for selectively turning or not turning the clips.

When the clips are conveyed downstream to the loading station of a cartoner, the clips are pushed transversely and endways into flat cartons from the buckets and through the transfer guide buckets, flat confiners or tamps descend over the clips to compress and hold them. When the clips are configured in U-shape for loading into boutique cartons, these flat confiners are changed out for narrow elongated tamps or confiners descending into the U-shaped clip's center to configure confine and hold it while it is pushed transversely out of the bucket through the transfer guide bucket and into the boutique carton by, for example, a synchronized barrel loader. This constitutes only minimal changeover parts which can be fitted and released, as desired, by quick coupling mechanisms, thus reducing or eliminating any significant downtime.

In a further aspect of the invention, its particular application to tissue cartons as described, the pitch of the flat cartons may vary from that of the boutique cartons. This is accommodated by using independent servo drives for the bucket conveyors and transfer guide conveyors on the one hand and the carton conveyor on the other. Where both of the diverse pitches are accommodated in a standard cartoner machine pitch of, for example, 12 inches, it is only necessary to use one independent servo drive to appropriately phase the relative position of the carton conveyor and the bucket conveyor and associated barrel loader.

Accordingly, the invention provides a flexible, dual function improved tissue handling apparatus for easily configuring tissue clips for flat or boutique cartoning.

These and other objectives and results will be readily appreciated from the following detailed description of a preferred embodiment of the invention and from the drawings in which:

BRIEF DESCRIPTION OF THE DRAWINGS

FIG. 1 is an expanded view of the load configuration of a tissue clip for a boutique carton;

FIG. 2 is an expanded view of the load configuration of a tissue clip for a flat carton;

FIG. 3 is a plan view of a tissue handling apparatus according to a preferred embodiment of the invention and shown together with upstream and downstream components of an entire system for loading clips into cartons;

DETAILED DESCRIPTION OF THE INVENTION

Figure 4:
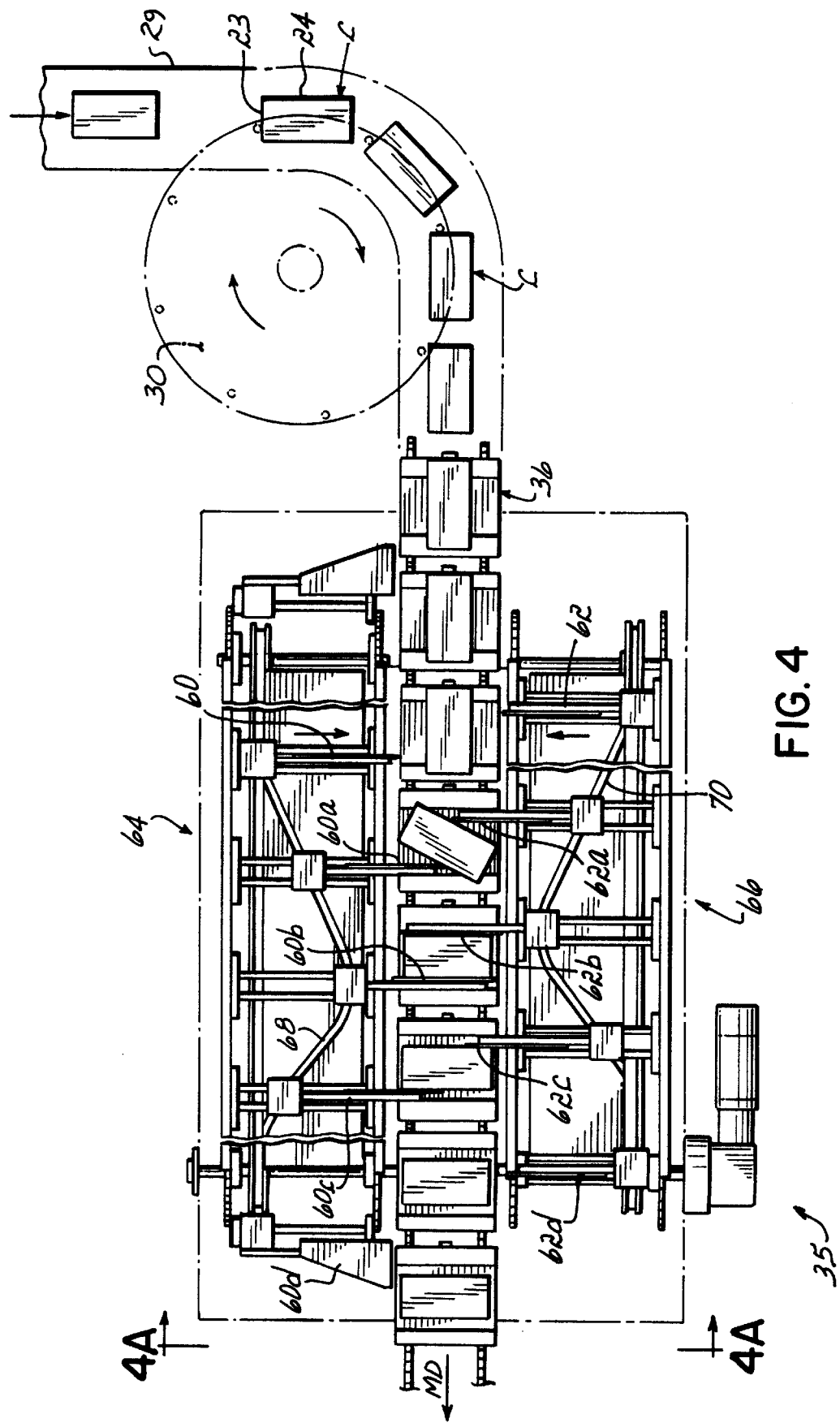
FIG. 4 is an enlarged plan view in more detail of that portion of a tissue handling apparatus shown at the right hand area of FIG. 3.

Turning now to the drawings, there is illustrated therein methods and apparatus for handling both a flat tissue clip configuration and an upright, cubic or boutique tissue clip configuration. Typically, tissues such as facial tissues are packed in flat or conventional shaped cartons. Alternately, tissue clips are bent or formed into a U-shape and these are packed in upright, cubic or boutique shaped cartons.

It will be appreciated that, while the invention described herein is particularly useful for handling clips in these alternate configurations, the invention and its principles can be found useful in handling or transporting other products or items having varying shapes or configurations.

Turning now to FIGS. 1 and 2, there is illustrated therein the orientation of clips of facial tissues both in a respective boutique clip configuration and in a flat clip configuration.

FIG. 1 illustrates the load orientation for a boutique clip configuration. In FIG. 1, an upright cubic or boutique carton 10 is illustrated having a tissue opening 11 in a major panel which is situated in this view on the bottom of the carton 10. A boutique clip 12 is illustrated in its boutique configuration such that the clip itself takes on a bent or U-shaped configuration for loading into the carton 10.

It will be appreciated that the clip has a width 13 and a foreshortened length from end-to-end due to the bending of the tissues in the clip, but generally running from the narrow edge of one tissue through the clip to its narrow opposed and parallel edge. Such a clip 12 is inserted into the carton 10 by means of a longitudinal U-shaped pusher 14 moving in a load direction 15 as will be described. The clips are preferably loaded on the move while they are being transported in a downstream or machine direction MD with the cartons 10 and the pusher 14 moving in the same downstream direction at the same time such that the pusher 14 is also moving transversely in the load direction to push the clips into the carton 10.

Illustrated in FIG. 2 is a carton of flat shaped or configuration 18. Carton 18 is also provided with a tissue opening 19 disposed in what is shown in FIG. 2 as a major bottom panel of the carton. A flat clip 20 comprising a plurality of facial tissues has narrow ends 21, 22, each defining across them a width 23, and the clip is elongated between ends 21, 22, defining a length 24. A U-shaped pusher 14 is moved in a load direction 15 to push the flat clip 20 endwise and transversely into the carton 18. This is accomplished while the clip 20, the carton 18 and the pusher 14 are also moving in a downstream direction.

It will be appreciated with respect to both FIGS. 1 and 2 that the cartons are conveyed in a downstream direction by a carton conveyor, such as a lug type conveyor, while the pushers 14 are conveyed sequentially in a downstream direction, one after the other, by means of a well known barrel loader which is useful to convey the pushers in a downstream or machine direction while, at the same time, causing the pushers to extend transversely to load the clips into the cartons respectively.

At the same time, the clips are carried in the separate buckets of a bucket conveyor (not shown in these figures) in the machine direction. As will be described, the clips are pushed from these buckets transversely through transfer guide buckets (not shown in FIGS. 1, 2) and into the cartons 10 and 18 respectively.

For illustration purposes, a complete system for loading individual clips which are discharged in any conventional manner, such as from a log saw 28, is illustrated in FIG. 3. The system shown in FIG. 3 includes a log saw discharging clips onto a clip conveyor 29 from where the clips are introduced into a spacing apparatus including a turnwheel 30 having depending clip pushing pins 31 for engaging the rear end of the clips and moving the clips in a curved path, as shown in this embodiment as a 90 degree turn, into a clip handling apparatus 35, as will be described in more particular detail herein.

When the clips are discharged from the wheel 30, they are deposited into buckets on a bucket conveyor 36, as also will be described in more detail. The clips can be deposited on the bucket conveyor 36 in any known fashion and by any apparatus which does not comprise a part of this particular invention. The clips may be fed onto the ends of the buckets or pushed onto them in that manner, or may be fed from an overhead position and dropped into the buckets. In any event, it will be appreciated that, at this point, all of the clips, whether to be formed in a boutique configuration or in a flat configuration are, in fact, flat and elongated in a machine direction MD as they reside on the buckets of the bucket conveyor 36 at this position.

From the clip handling apparatus 35, the clips are conveyed in the buckets to a cartoning apparatus for moving the clips from the full bucket conveyors into respective cartons.

This cartoner is illustrated at 38 and includes carton feeding and erecting apparatus 39, a carton conveyor 40, a transfer guide bucket conveyor 41 and downstream carton handling apparatus including dust flap closing, gluing, flap closing, compression and other conveying apparatus for finishing the carton and feeding it to a product discharge end 43 of the cartoner, where the respective cartons either of the boutique style 10 or the flat style 18 are discharged for packaging and shipment. The cartoner 38 includes a barrel loader 32 of typical configuration including a cam track 34 for moving pushers to load cartons as will be described. Also, at the cartoner, a carousel 33 is disposed above bucket conveyor 36 and transfer guide conveyor 41 as will be described.

The handling apparatus 35 of the invention is best seen in the right hand area of FIG. 3 which appears in enlarged format in FIG. 4.

In FIG. 4, it will be appreciated that a plurality of clips are sequentially transported by the bucket conveyor 36 into the clip handling apparatus 35. At this point, it will be instructive to note that the clips C are all elongated and in flat configuration, having a longitudinal dimension moving in the same direction and in parallel with the machine direction MD of the bucket conveyor 36. In this configuration, the clips all span transverse channels (described below) in the buckets.

Figure 5:
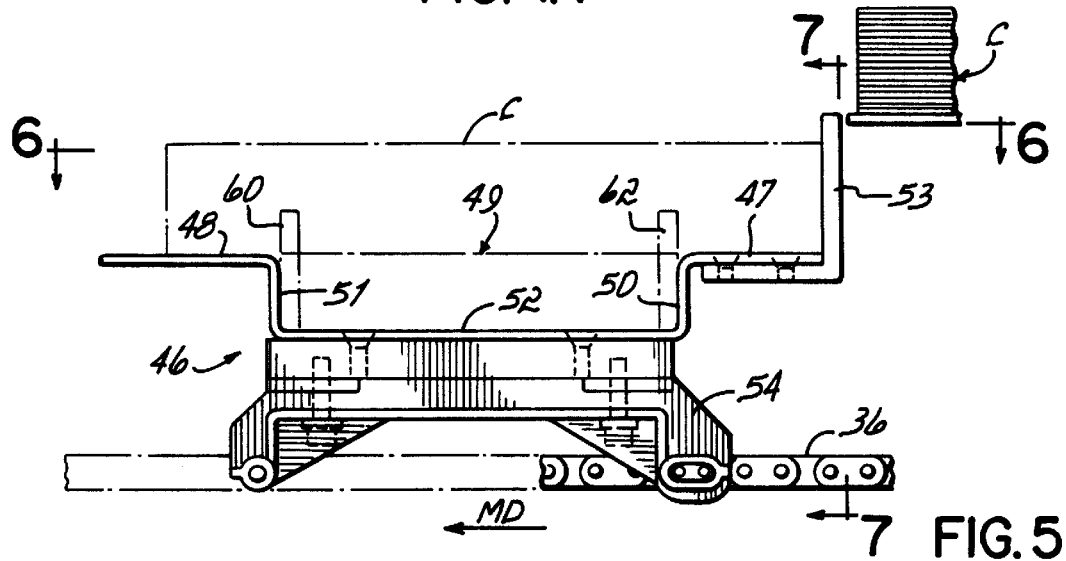
FIG. 5 is a side view of a clip receiving and turning bucket according to the invention and showing in phantom a clip before turning.
Figure 6:
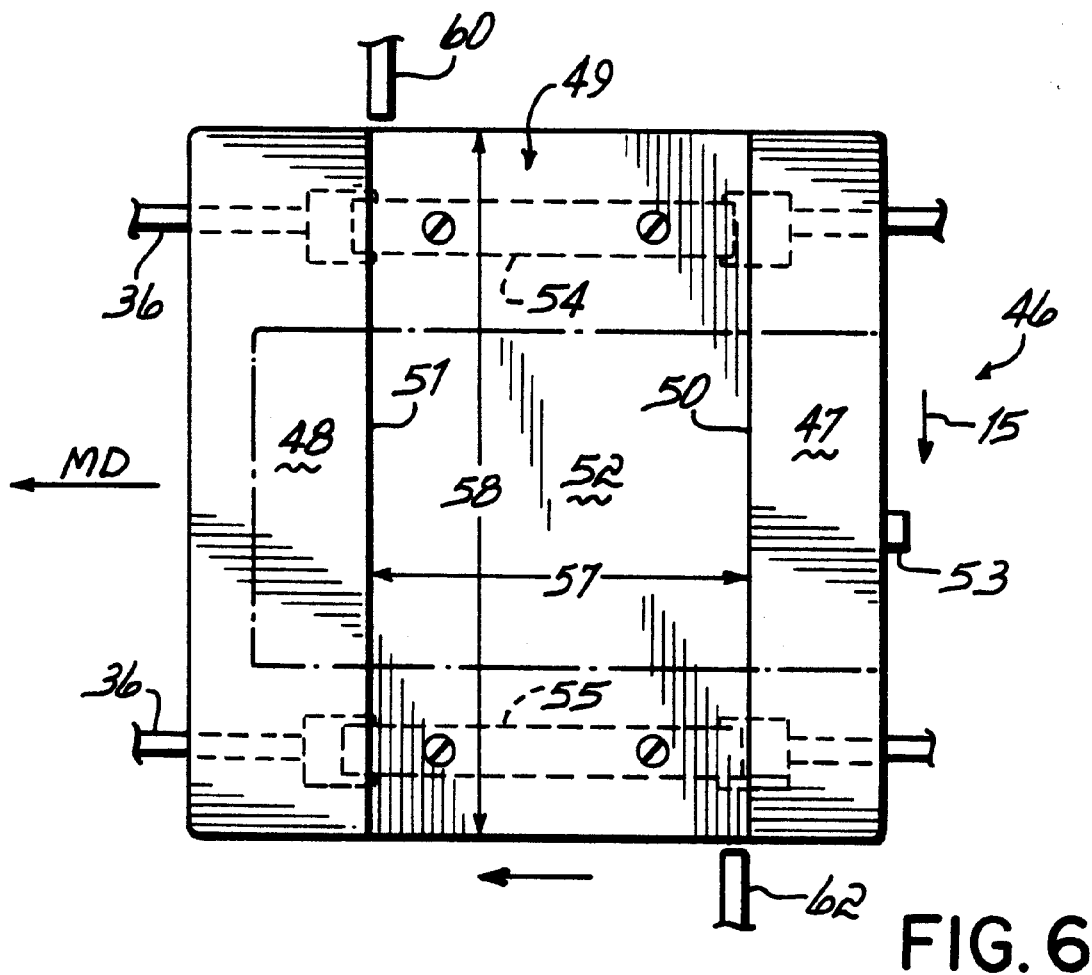
FIG. 6 is a plan view taken along lines 6—6 of FIG. 5.
Figure 7:
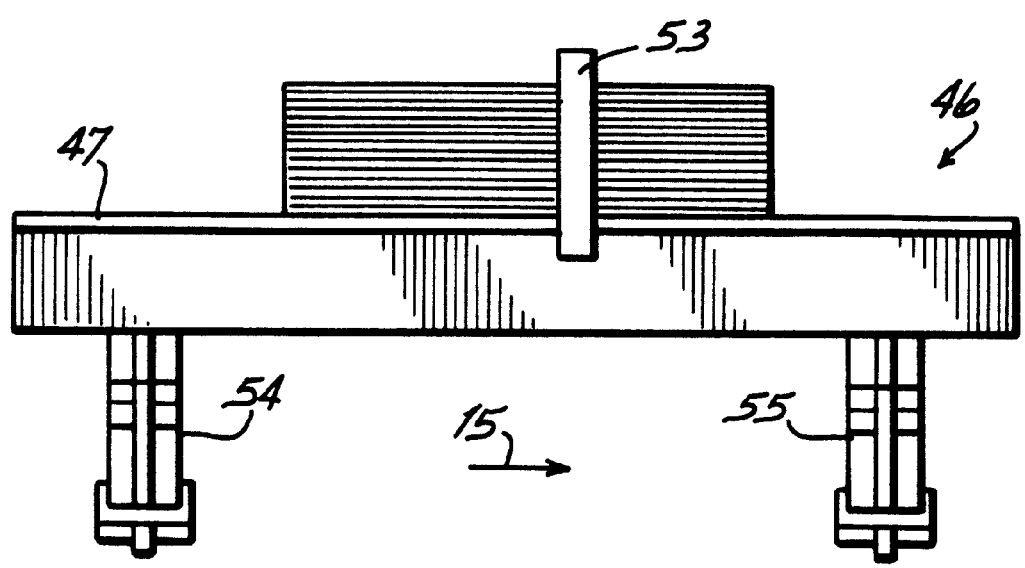
FIG. 7 is an end view taken along lines 7—7 of FIG. 5.

Turning now momentarily to FIGS. 5–7, the individual buckets of the bucket conveyor 36 will be described. The individual buckets 46, as perhaps best seen in FIG. 5, include a bucket floor comprising a rearward transverse floor surface 47 and a forward transverse floor surface 48. A channel 49 is disposed in the floor defined by surfaces 47, 48 and comprises channel walls 50. 51 and channel floor 52. As shown in FIG. 5, channel floor 52 is depressed or lower than the floor surface 47, 48 of the bucket 46.

Each bucket is provided with a clip pusher 53 extending above the floor surface 47 at the trailing edge of the bucket. The bucket is mounted on two carrying brackets 54, 55 which are provided with provisions for securing the buckets to parallel conveyor chains which comprise the bucket conveyor 36. Each of the buckets is centered on the chains at a desired pitch of, for example, twelve inches.

Further, it will be appreciated that the bucket channel 49 has a predetermined width illustrated at 57 and a predetermined transverse length indicated at 58. The length 58 of the channel 49 is somewhat longer than the length 24 of the flat clips C. At the same time, it will be appreciated that the width 57 of channel 49 between the walls 50. 51 is somewhat wider or greater than the width 23 of the clips C and, as well, the widths 13 and 23 of the flat clips, as shown in the various figures. Moreover, the width 57 of channel 49 is significantly shorter than the length 24 of any flat clip as deposited on the bucket in the machine direction MD.

Accordingly, when a flat clip C is placed onto the bucket 46, such a clip C being shown in phantom in FIGS. 5 and 6, it will be appreciated that the clip spans the channel 49 with the forward and trailing ends of the longitudinal dimension of the clip being supported respectively on the floor surfaces 48 and 47 of the bucket 46.

It will be appreciated that in this configuration, the longitudinal dimension extending between the short ends 21, 22 of the clip is arranged parallel to the machine direction and motion of the buckets in the bucket conveyor 36 as they move through the apparatus. Thus, as initially introduced to the buckets 46 on bucket conveyor 36, the clips are moving downstream in machine direction but in an orientation which is 90 degrees off from that desired for eventual loading of flat clips onto flat cartons.

Specifically and as noted above, it is most desirable to insert the clips endwise into flat cartons 18. Since the clips are initially moved lengthwise in a downstream direction however, it is necessary to turn them 90 degrees so that they can be pushed transversely out of the buckets in an endwise direction at the cartoner to load flat cartons 18.

In order to accommodate this reorientation of the clips C, or clip 20 in this case, where a flat configuration is desired for filling a flat carton 18, the buckets 46 according to the invention are provided with the channels 49. When the clips are turned 90 degrees, they drop into the channel 49 from where they can now be moved transversely in an endwise direction into an appropriate downstream carton 18 as will be further described.

Figure 4A:
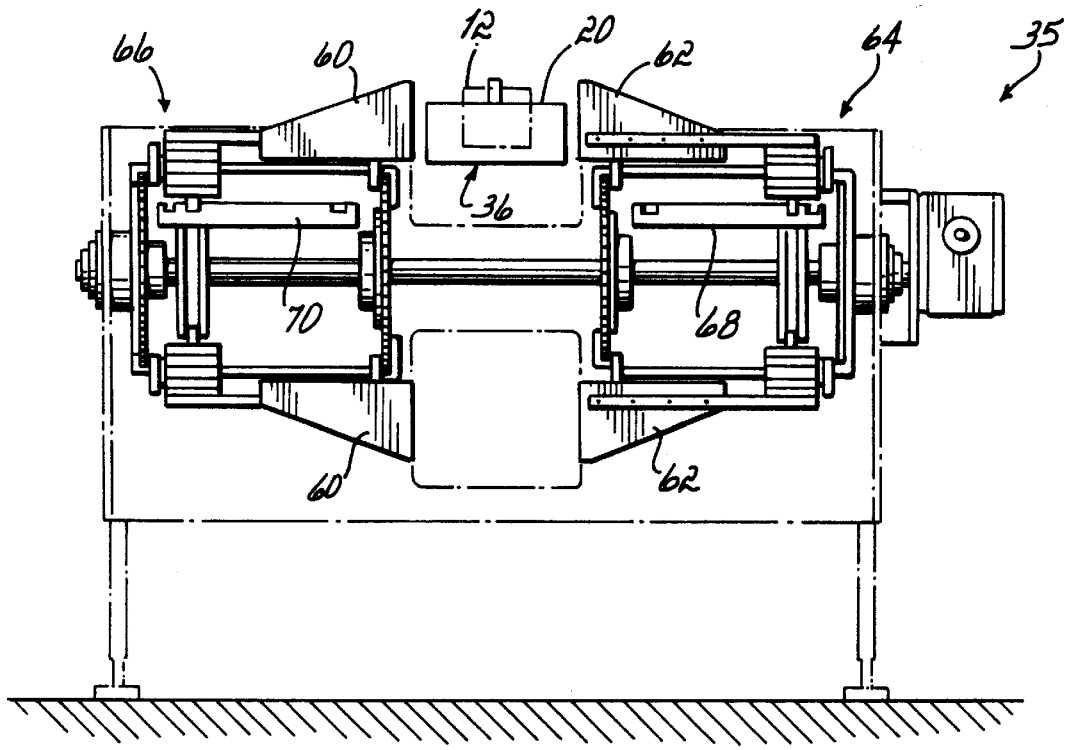
FIG. 4A is an illustrative end view taken along lines 4A—4A of FIG. 4.
Figure 8:
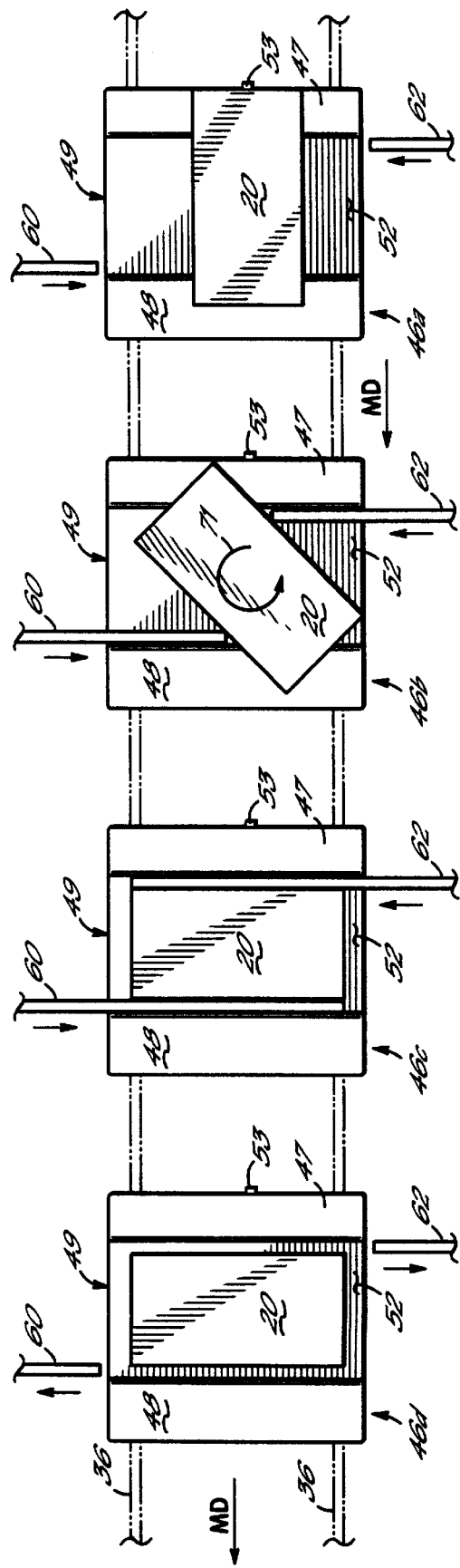
FIG. 8 is an illustrative operational view of the turning and dropping of a clip into a bucket channel according to the invention.

In order to turn the clips, apparatus such as that illustrated in FIGS. 4, 4A and 8 is provided according to the invention. In particular, the handling apparatus 35 as shown in FIG. 4 is provided with a plurality of transversely movable and offset pushers, such as pushers 60–60D on one side of the bucket conveyor 36 and pushers 62–62D on the other side of bucket conveyor 36.

Each of the pushers 60, 62 and their similar pushers, are mounted on respective barrel loader-like apparatus 64, 66, including cams 68, 70 operationally disposed on opposite sides of bucket conveyor 36. Each of the pushers is carried on a carriage, such as that illustrated in FIG. 4, mounted on slides and a cam follower is disposed on each of the carriages and is operable to move the slides in a perpendicular direction with respect to the machine direction MD to carry the pushers across the bucket conveyor 36 as will be described.

It will be further appreciated that the pushers 60. 62 and their downstream similar elements are offset in the machine direction MD, one from the other. Accordingly, it will be appreciated that pusher 60 leads pusher 62, pusher 60A leads pusher 62A, pusher 60B leads pusher 62B, pusher 60C leads pusher 62C and pusher 60D leads pusher 62D. Thus, it will be appreciated that the pushers 60 are offset in a downstream direction from the pushers 62.

As seen in FIG. 4, it will be appreciated that as the pushers are extended by the respective cams 68, 70, they engage the clips C (20) at positions which are offset with respect to the direction machine direction. The offset forces on longitudinally displaced locations on opposite sides of the clips C serve to twist or turn the clips so that the clips slide across the floor surfaces 47. 48 respectively of the buckets 46 until the clips are reoriented 90 degrees, such as that position shown between pushers 60B and 62B in FIG. 4.

In this condition, the clips fall freely from bucket floor surfaces 47, 48 into the channels 49 and channel floors 52 of each of the individual buckets on which the clips are being carried. At the same time, it will be appreciated from FIG. 4A that the respective pushers 60, 62 are of such a height and shape that the pushers extend down into the channel 49, but also above the channels.

As noted above, the channel is sufficiently wide, front to back, that it can accommodate not only the clip tying therein, but the relatively thin width of each of the extended pushers 60, 62, one lying on each side of the clip between the clip and the respective adjacent channel wall, 50, 51 respectively.

Figure 5A:
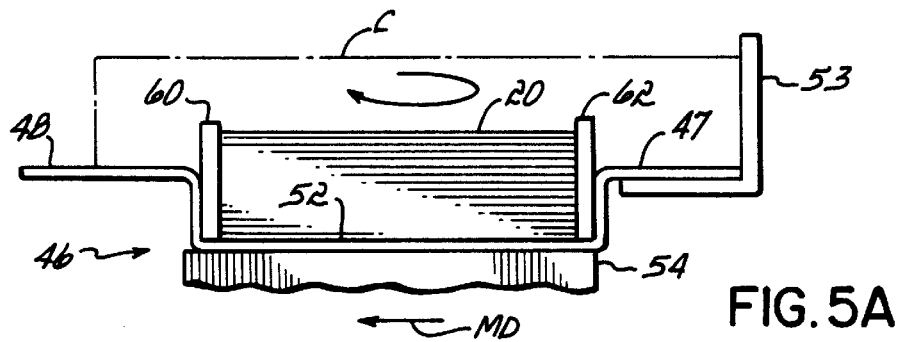
FIG. 5A is a view similar to FIG. 5, but showing a turned flat clip.

This orientation of the pushers 60, 62 is shown in phantom in FIGS. 5 and 5A and also in FIG. 6 where the pushers are withdrawn. This orientation is also illustrated in FIG. 8 as will be appreciated.

After the clips have been turned and dropped into the respective channels 49, continued downstream motion causes the barrel loader-like apparatus 64, 66 to withdraw the respective pushers as illustrated in FIG. 4. The clips thereafter are conveyed in a downstream direction in an aligned fashion, centered in the channels 49 of the buckets 46.

It will be appreciated that the pushers 60, 62 serve, not only to turn the clips, but to control the clips during this turning and during their dropping into the channel 49 so that the clips are maintained in an aligned and uniform condition. The flat sided pushers engage and control the sides of the clip as it drops and lands on the channel floor 52.

It should also be appreciated that it is not necessary for the pushers to move into the channels 49. For example, in an alternate embodiment, the pushers 60, 62 may extend across the buckets 46 generally at the level of floor surfaces 47, 48 but not below into the channels. In such a case, the front-to-back channel width between walls 50, 51 is selected more closely to the width of clips 20. In this case, the clip sides are first engaged by the pusher ends, then their respective internal opposed surfaces, then the channel walls 50, 51 to maintain their alignment in the channels.

Moreover, it will be appreciated that as the pushers engage the opposite sides of the clips C or 20, they have a centering effect on the clips so that the end result is that the clips are positioned within the bucket channels 49 so that their ends do not overhang either of the edges of the buckets 46.

Of course, it is not desirable to turn the clips C when those clips will be eventually configured into a U-shaped boutique configuration for packaging in a boutique carton 10. Accordingly, when the machine is selectively set up to handle clips in a boutique configuration, the barrel loader-like apparatus on either side of the bucket conveyor 36 is switched so that the cam followers of the carriages for the pushers 60. 62 are directed into a straight direction (MD) track which does not taper toward the bucket conveyor 36. Thus, the pushers are rendered inactive and do not turn the clips on the buckets. Instead, the clips are simply conveyed downstream, with their longitudinal dimension moving along with and parallel to the machine direction MD.

Alternately, or in addition, the bucket loader-like pusher apparatus 64, 66 can simply be stopped, this being accommodated, for example, by an independent drive, and it will be appreciated that the bucket loader-like pushers are independently mounted and driven with respect to the bucket conveyor 36.

It will also be appreciated that the respective clips C may be one height when it is desired to eventually configure those clips into a boutique configuration, such as boutique clip 12 and another height when they are to be configured into a flat clip configuration, such as flat clip 20.

Accordingly, it will be appreciated that as used herein, the letter C is used to refer to clips generically, however those clips will be later configured, while the number 20 refers to the flat clips which will be configured and packaged in that manner and the number 12 is used to referred to clips which are or will be configured in a bent or boutique clip configuration for packaging in a boutique carton 10.

The sequence of operation described above in terms of turning a clip 20 is further seen in the illustrative plan view of FIG. 8. In that figure, it will be appreciated that a clip 20 is carried on the floor surfaces 47, 48 of a bucket 46 spanning the channel 49. When the clips are carried by the buckets, they are pushed by the dogs or pushers 53 as illustrated at the bucket 46A in FIG. 8. Floor surfaces 47, 48 are in a plan disposed above that of channel floor 52.

The downstream bucket has moved to a position where the barrel loader-like apparatus has engaged the pushers 60, 62 to move inwardly into the channel 49 across the buckets 46, and engage the clip 20, thereby turning or rotating it in the direction of the arrow 71. As shown with respect to the bucket 46C in FIG. 8, the pushers 60, 62 have been fully extended into the channel 49 and across the bucket 46C, allowing positioning and fully turning the clip 20 a rotation of 90 degrees from its position as shown in bucket 46A where the clip 20 is dropped into the channel. The clip 20 is dropped into the channel 49 of the bucket 46C onto floor 52.

Thereafter in a further downstream position with respect to bucket 46D, the pushers 60, 62 have been withdrawn, leaving the clip centered and aligned in the channel 49 for further handling and packaging.

As noted above, this turning operation would be omitted in the case of clips C which are to be configured in a boutique or bent configuration. Those clips simply remain in position as does the clip 20 as shown in bucket 46A, the pushers 60, 62 having been disabled.

Figure 9:
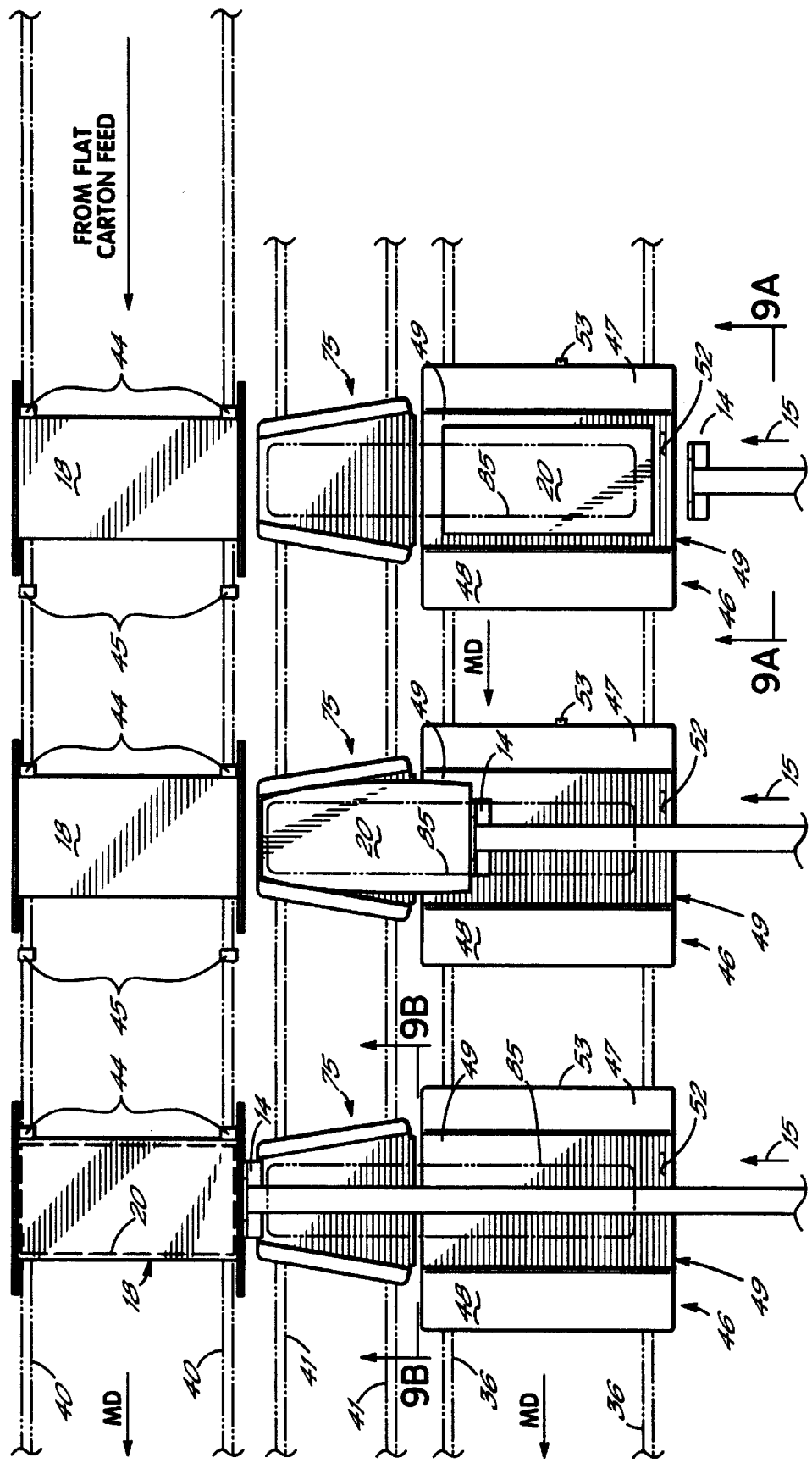
FIG. 9 is an illustrative plan view of loading flat configured clips from buckets, through transfer buckets, into flat cartons.
Figure 10:
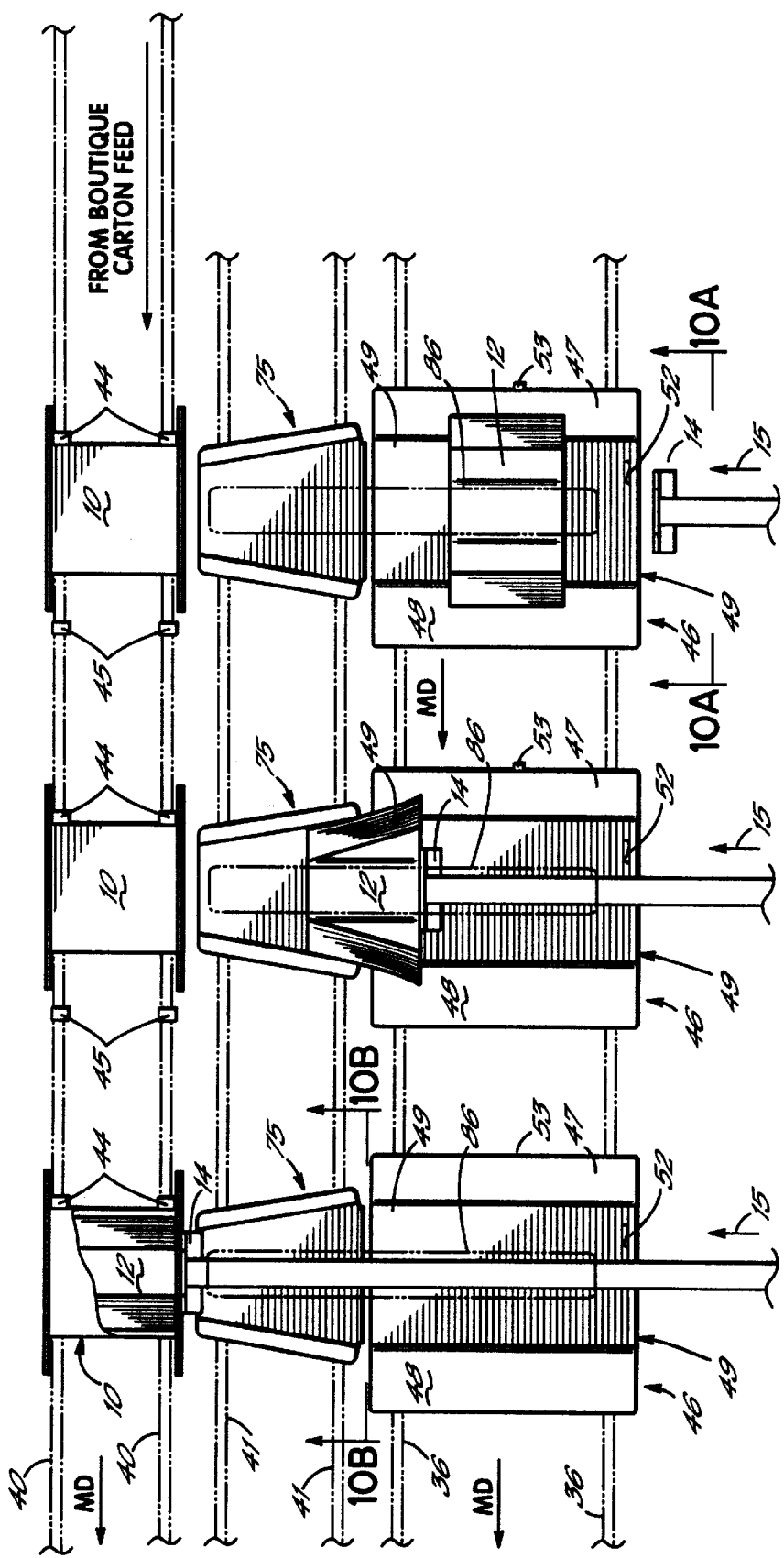
FIG. 10 is an illustrative plan view of loading boutique configured clips from buckets through transfer guide buckets into boutique cartons.
Figure 10B:
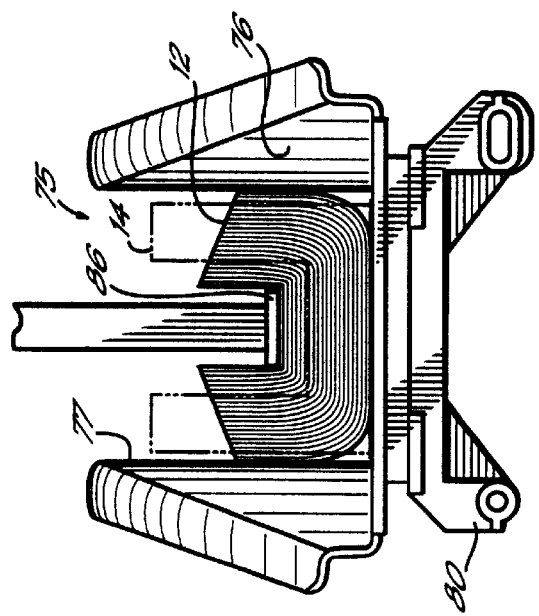
FIG. 10B is an illustrative side view taken along lines 10B—10B of FIG. 10.

Turning now to FIGS. 9 and 10, there is illustrated therein a further packaging of the clips into the respective cartons at the cartoner 38. Cartoner 38 includes a carton feeder 39, such as flat carton feeder FCF, for feeding cartons onto a carton conveyor 40, the lugs of which are illustrated respectively in FIGS. 9 and 10 as lug sets 44, 45.

As shown in FIG. 9, lug sets 44 engage erected flat cartons 18 and moves them in the downstream direction or machine direction. FIG. 9 will be described in this connection as illustrating the loading of the flat cartons 18 with flat clips 20.

Figure 11:
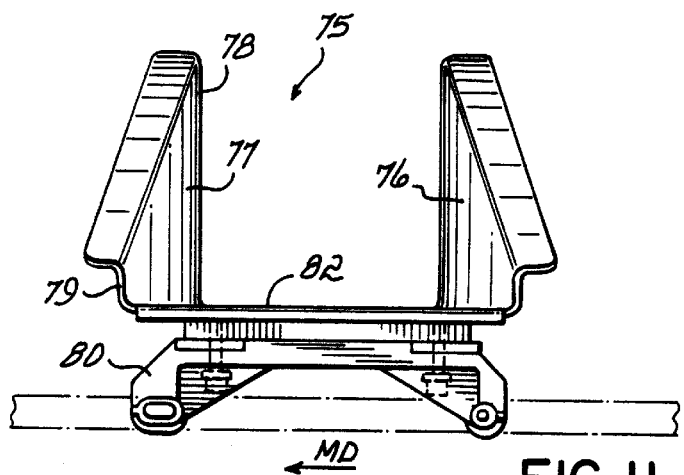
FIG. 11 is a load end view of a transfer bucket.
Figure 11A:
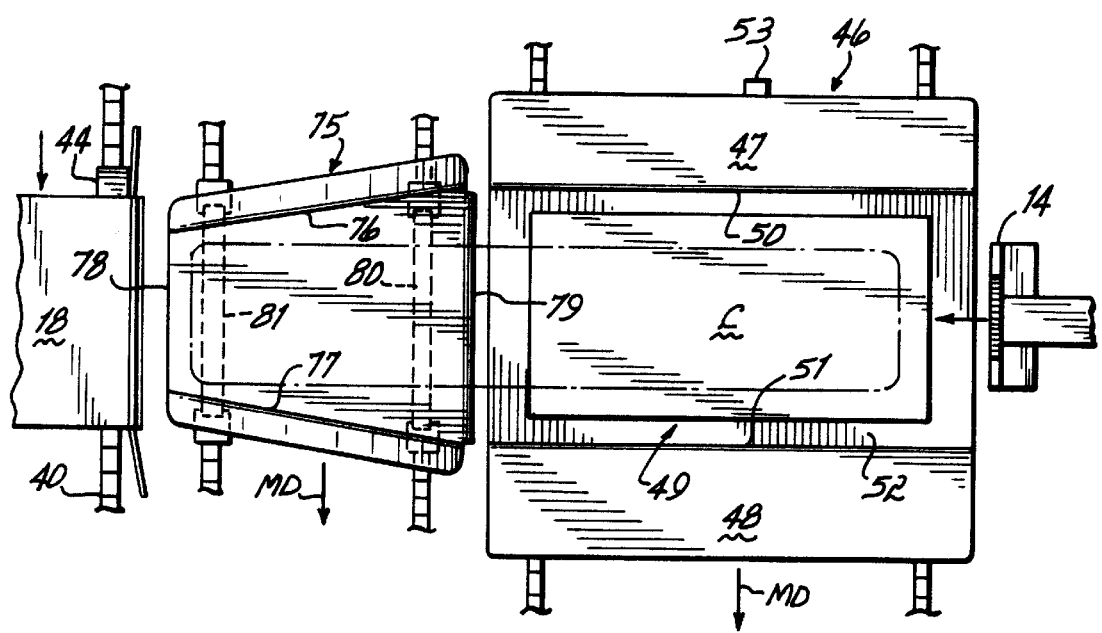
FIG. 11A is a top plan view of the transfer bucket of FIG. 11 shown in place between a carton and a bucket.
Figure 11B:
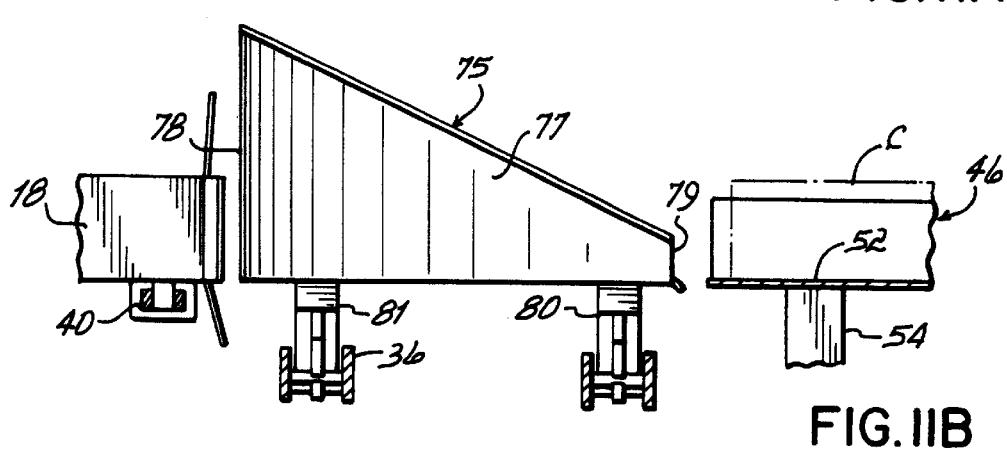
FIG. 11B is a side view of the transfer bucket and adjacent components of FIG. 11B.

It will be appreciated that the cartoner 38 also includes a transfer bucket conveyor 41 having a plurality of transfer buckets 75. This transfer bucket conveyor 41 is elongated in the machine direction and is interposed between bucket conveyor 36 and carton conveyor 40. The construction of these buckets 75 is perhaps best seen in FIGS. 11, 11A and 11B. Each transfer bucket has two opposed sidewalls, 76, 77 which converge toward a discharge end 78 from a wider receiving end 79. Each of the buckets 75 are mounted on two brackets 80, 81 comprising the guide of the transfer guide bucket conveyor 41.

It will be appreciated that the guide bucket conveyor 41 as disposed in the cartoner apparatus 38 has only a limited operational run, as diagrammatically indicated in FIG. 3. This transfer guide bucket conveyor is disposed between the carton conveyor 40 on the one side and the guide bucket conveyor 36 on the other, so that clips which are pushed from the guide bucket conveyor 36 are moved transversely through the guide buckets 75 and into the cartons 18.

In this regard, it will be appreciated that the bucket channels 49 are indexed and aligned with the transfer guide buckets 75 and that the floors 52 of the buckets 46 are in preferably the same plane as the floors 82 of the transfer guide bucket 75.

It will also be appreciated that the carton conveyor 40 is provided in a standard or other desirable pitch such as twelve inches, however, it will be appreciated that that pitch is defined by, for example, the lug sets 44, with the lug sets 45 being disposed within that pitch. In any event, the bottom panel of the carton is disposed in about the same plan and level as the floors 82 of the transfer bucket 75 and 52 of channel 49 of buckets 46, and in any event significantly lower than bucket floor surfaces 47, 48.

It will also be appreciated that the lug sets 45 are on a similar pitch with respect to each other, but that the distances between the lug sets 44 and 45 respectively may vary, one to accommodate one particular width of a flat carton 18, for example, and the other to accommodate the particular leading to trailing edge width of a boutique carton 10, for example, as will be described in connection with FIG. 10.

Accordingly, it will be appreciated that the bucket conveyor 36 and the transfer bucket conveyor 41 are driven by drives which are controlled by independent servo drives with respect to the carton conveyor 40 so that the appropriate phase alignment can be made when the machine is selectively switched from handling flat clips, such as clips 20 for example, to boutique configured clips, such as clips 12.

Also, it will be appreciated that the loading of the clips 20 into the cartons 18 as shown in FIG. 9 is accomplished by a conventional barrel loader 32 (not shown in detail) having disposed on the ends of its pushers a U-shaped pusher 14. This pusher moves in a load direction 15 to push the clips 20 from the floors 52 of the channels 49 through the transfer guide buckets 75, across their floors 82 and into the cartons 18 as illustrated in FIG. 9.

Thereafter, the barrel loader 32 withdraws the pushers 14 and the filled cartons 18 are moved downstream for flap gluing, closing, and other finishing steps and discharge.

It will be appreciated that the clips 20 are preferably compressed as they enter the cartoner 38 and are prepped for transport into the cartons. Flat confiners or tampers 85 are shown in this regard. For example, in FIG. 9A, a confiner or tamp 85 which may be mounted on an overhead carousel 33, for example, descends via means of a cam driven track, for example, onto the clip 20, confining and compressing it in the channel 49.

Figure 9B:
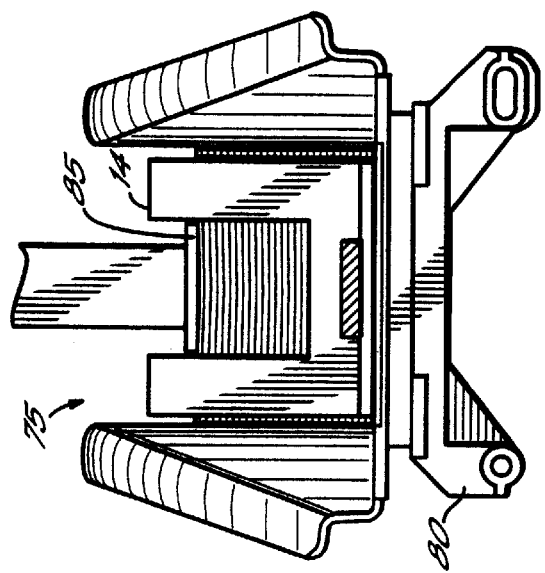
FIG. 9B is an illustrative side view taken along lines 9B—9B of FIG. 9.

This confiner 85 may be elongated so that it extends along the full length of the clip tying transversely across the bucket 46. This confiner may also extend into or over the guide bucket 75 as illustrated in FIG. 9B, however, the confiner 85 stops short in a transverse direction from the cartons 18. Thereafter, the confiners 85 are lifted upwardly and away, where they are moved through a return run and back toward an entry end of the cartoner 38.

Figure 9A:
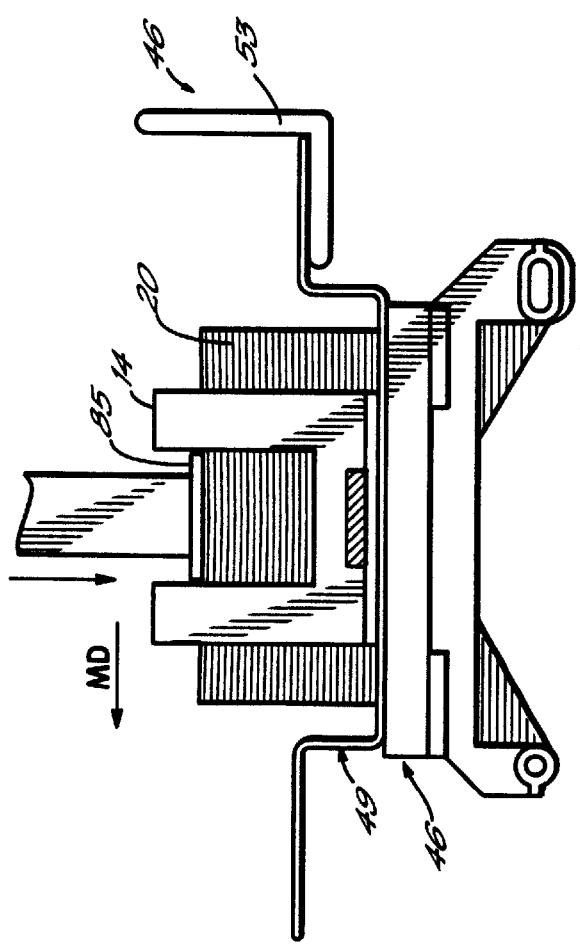
FIG. 9A is an illustrative side view taken along lines 9A—9A of FIG. 9.

Accordingly, FIG. 9A illustrates a confiner which is moved downwardly and which also continues to move in machine direction MD to compress and confine the flat clip 20 before and while it is being pushed with the U-shaped pusher 14 which does not interfere with the confiner 85 transversely through the transfer bucket conveyor 75 and into the carton 18.

FIG. 9B illustrates the continuing influence of the confiner 85 on the clip 20 as it is pushed through the guide bucket 75 and into the carton 18.

Turning now to FIG. 10, it will be appreciated that this figure illustrates the packaging of a clip 10 in a boutique carton or container 10 by first configuring the clip into a boutique shaped clip 12. In FIG. 10 it will be appreciated that a boutique carton feeder (BCF) has fed cartons 10 onto the carton conveyor 40, the cartons 10 being driven by the sets of carton conveying lugs 45 at an appropriate pitch, and that the transfer guide bucket conveyor 41 and the bucket conveyor 36 has been phased by means of an appropriate servo drive into appropriate registry with the cartons 10, all of which move downstream and in a machine direction. Of course, it would be possible to provide a line drive machine, where the various phases are mechanically adjusted, however, the servo drive mechanisms for the various conveyors have been found to easily produce the phase registries that are required between the components.

Figure 10A:
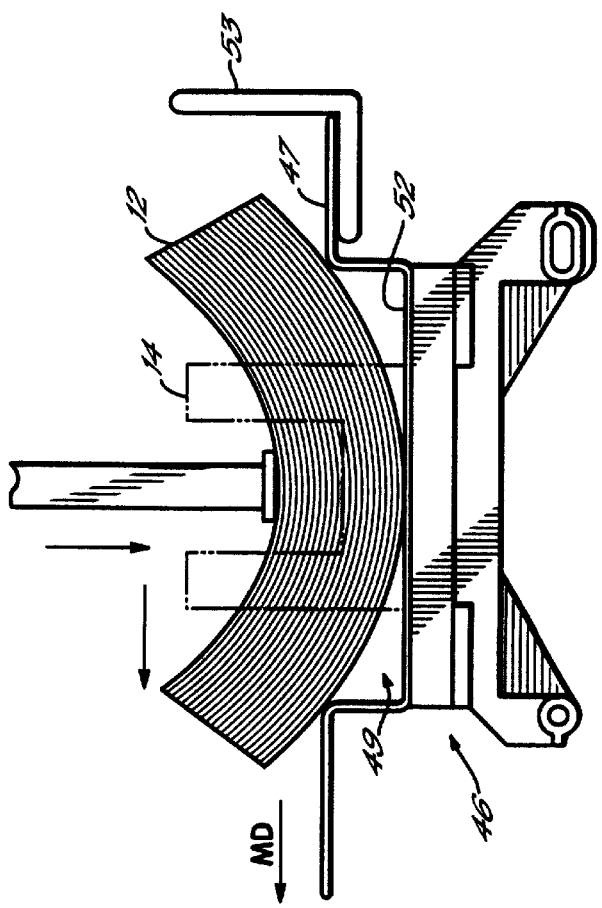
FIG. 10A is an illustrative side view taken along lines 10A—10A of FIG. 10.

As shown in FIG. 10, the clip 12 lies or spans across and over the channel 49 and is supported by the surfaces 47. 48 of the buckets 46. An elongated confiner or tamp 86, which has been substituted for tamp 85, is utilized to initiate and hold the clip 12 in a U-shaped configuration partially at least down into channel 49. Confiner 86 is not as wide in the machine direction as confiner 85 and, when moved downwardly as illustrated in FIG. 10A, pushes the clip downwardly into the channel 49 of the bucket 46, so that the clip takes on a U-shaped configuration. This shape may be more steeply inclined than as shown in FIG. 10A when tamp 86 compresses the bight of the clip 12.

As the side of clip 12 is engaged by the U-shaped pusher 14, the clip is pushed transversely out of the channel in a load direction 15 into the transfer guide buckets 75, the floors of which are preferably co-planar with the floors 52 of the bucket channels 49.

The confiners or tamps 86 are elongated so they extend over the transfer guide bucket 75 and the confiners are carried on the horizontally moving carousel 33 described above, for example, with the confiners being raised and lowered by an appropriate cam track, just as the confiners 85 with respect to FIG. 9. The confiners extend laterally or transversely in a load direction 15 into the area of the transfer guide buckets 75 and thus hold and maintain the clips 12 in a U-shaped configuration, somewhat pressing the bight or intermediate portion of the clip into the channel 49 and into the respective guide buckets 75 as the clip is pushed.

The inwardly tapered walls 77, 76 of the transfer guide buckets serve to further confine and shape the boutique clips 12 into the appropriate final configuration for loading into the cartons 10 as illustrated in FIG. 10 as the buckets 46, the containers 10 and the guide buckets 75 move from right to left as shown in this figure.

The pushers 14 are mounted on and actuated by a barrel loader of any conventional design, such that the pushers 14 are moved in a load direction 15 as shown in FIG. 10, transversely of the buckets 46 and the transfer guide buckets 75 to push the clips into the boutique cartons 10 in a bent or U-shaped configuration.

Accordingly, it will be appreciated that the clips 12 are urged downwardly and at least partially into the channels 49 to provide and accommodate their boutique configuration for loading into the cartons 10. Thereafter, the barrel loader withdraws the pusher 14 and the confiners 86 are raised, both to operate through return runs for further engagement, as the machine continues in operation.

In an alternative embodiment for boutique clip handling and loading, it will be appreciated that a manufacturer might desire to load the clips upside down from the configuration described above. In other words, the curved intermediate portion or the bight is up, while the clip ends are directed down.

In such a case, the apparatus described above is modified with a device placed in the channel floor 52 of buckets 46 to selectively raise the bight portion of the clip. Instead of tamp 86, a C-shaped tamp is used to press the ends of the clip downwardly toward the bucket 46 as it is compressed and pushed sideways through transfer buckets and into a boutique carton.

Accordingly, it will be appreciated that the clip handling apparatus 35, as particularly illustrated in FIG. 4, for example, renders the entire tissue cartoning process viable for handling both flat carton tissue clips and boutique carton clip configurations with minimal equipment changeover such as, for example, the changeover between the confiners 85 and 86 by means of any quick releasable interconnecting means.

Moreover, it will be appreciated that the tissue handling apparatus as illustrated in FIG. 4 provides positive control over the tissue clips which are to be turned, centering them in the bucket channels and dropping them into the channels while maintaining them in an aligned format.

The clips cannot be over-rotated by virtue of the speed of the turning operation, since they are held and confined by the pushers 60, 62 during the turning operation and as the clips are dropped into the channels.

Moreover, it will be appreciated that the pushers 60, 62 are easily deactivated when it is desired to leave the clips moving with longitudinal dimensions headed downstream when, for example, the clips are to be configured in a boutique configuration.

Accordingly, it is not necessary for the packager to purchase two machines, one for flat carton clip handling and one for boutique carton clip handling, nor is it necessary for the packager to acquire a machine which requires numerous and expensive changeover parts and significant downtime, when it is desired to selectively change from one clip configuration to the other.

These and other objectives and advantages will become readily apparent to those of ordinary skill in the art, without departing from the scope of the invention, and applicant intends to be bound only by the claims appended hereto.

We claim:

1. A tissue handling apparatus for receiving tissue clips and for transferring said clips selectively into configurations suitable for selective flat or boutique packaging, said transfer comprising:

a plurality of movable buckets having bucket floors for receiving and transferring tissue clips toward containers, a respective transverse channel in each of said floors of said buckets, said clips having an elongated length and a shorter width and said channels having channel walls spaced apart to define a channel width wider than the width of said clips and narrower than the elongated length of said clips, wherein said clips are received in said buckets with their elongated length spanning said channel, and further including means for selectively turning said clips for dropping into said channels, respectively, while aligning said clips therein.

2. A tissue handling apparatus as in claim 1 wherein said channels have a channel floor at an elevation and onto which clips are dropped when turned, and further including a cartoner for loading said clips endwise into flat cartons, said cartoner having a transfer guide bucket conveyor comprising a plurality of transfer buckets, said buckets having a floor disposed in a plane at substantially the same elevation as the channel floor of said channels.

3. A tissue handling apparatus as in claim 2 wherein said bucket floor is disposed at an elevation above the elevation of said channel floor.

4. Apparatus as in claim 1 wherein said means for selectively turning comprises pushers operating alongside said buckets and being selectively extensible from opposite sides thereof into said channels and across said buckets above said channels at positions displaced in a machine direction of motion of said buckets for selectively turning clips spanning said channels and for guiding said clips dropping into said channels.

5. A tissue transfer for receiving tissue clips and for selectively transferring said clips selectively into flat cartons or into boutique cartons and comprising:

a bucket conveyor having a plurality of buckets, each bucket in said plurality including a floor and a respective channel disposed in each of said floors, and said buckets being carried in a machine direction;

said clips being elongated and being received in respective ones of said buckets with elongated edges oriented in parallel with said machine direction such that said clips span respective channels in said bucket floors, opposed turning members for selectively turning said clips with their elongated edges aligned transversely to said machine direction, such that said clips fall into said channels when said clips are to be placed into flat cartons, said turning members aligning said clips in said respective channels, forming apparatus operably associated in proximity with said buckets for selectively bending said clips at least partially into said respective channels when said clips are to be placed into boutique cartons, and means for transferring said clips transversely from said bucket into respective cartons.

6. A tissue handling apparatus for receiving tissue clips and for configuring said clips selectively for insertion into flat or boutique cartons, said apparatus comprising:

a transfer bucket conveyor having a plurality of respective buckets thereon for conveyance in a machine direction, said buckets each having a bucket floor and a respective channel disposed in each of said floors transversely to the machine direction, said clips having a length and a shorter width, said channel having a width in a machine direction shorter than the clip length and greater than the clip width, said clips being initially deposited in said buckets with the clip length aligned in the machine direction, such that respective clips span the channels in the respective buckets, and opposed pushers selectively operable to move into said channels and to turn said clips to drop them into said channels when said clips are to be transferred endwise transversely into flat cartons, said pushers being selectively inoperative when said clips are to be configured for insertion sideways into boutique cartons.

7. A tissue handling apparatus as in claim 6 wherein said opposed pushers are carried on respective barrel loader apparatus disposed on opposite sides of said buckets.

8. A tissue handling apparatus as in claim 6 wherein said channels have walls and said channels are wide enough to receive a clip therein with a pusher between each side of said clip and a respective wall of said channel.

9. A tissue handling apparatus as in claim 6 further including apparatus for inserting clips configured for boutique packing into boutique cartons and having a clip tamp for pushing a portion of said clips into said channels and for forming said clips toward a bent configuration for transfer into a boutique carton.

10. A tissue handling and cartoning apparatus for selectively loading flat cartons and boutique cartons with clips of tissues;

a plurality of movable buckets, each having a bucket floor for receiving tissue clips and transporting tissue clips in a machine direction into a cartoner;

a respective transverse channel defined in each of said floors;

said channels each having a respective channel floor;

said tissue clips having a length longer than their width, said channel having a width in the machine direction, which is wider than the width of said clips but shorter than the length of said clips wherein said clips are received in said buckets with their elongated length spanning said channel and oriented in the machine direction;

pusher apparatus for selectively turning said clips and guiding them while dropping them onto said channel floors, respectively when said clips are to be inserted in flat cartons; and apparatus for confining said clips for insertion into cartons;

said confining apparatus comprising a tamp for bending an intermediate portion of a clip spanning said channel at least partially into said channel when said clips are to be loaded into a boutique carton.

11. Apparatus as in claim 10 wherein said confining apparatus is carried on a conveyor disposed above said buckets at a carton loading position.

12. Apparatus as in claim 10 including a transfer guide bucket conveyor and a carton conveyor, each running alongside said bucket conveyor at a carton loading position, said carton conveyor conveying cartons in operative alignment with said buckets on said bucket conveyor.

13. Apparatus as in claim 12 including transfer guide buckets on said transfer guide conveyor and in operative alignment with respective cartons and buckets of said bucket conveyor, said transfer guide buckets each having a floor disposed in substantially the same plane as the floors of said channels in said buckets.

14. Apparatus as in claim 13 wherein said carton conveyor conveys cartons having a major panel disposed substantially in another plane below a plane of the bucket floors.

15. Apparatus as in claim 14 wherein said confining apparatus extends across said buckets and over at least a portion of said transfer guide buckets.

16. Apparatus as in claim 10 wherein said confining apparatus is carried on a carousel over said buckets and further including means for lowering tamps onto clips in said buckets.

17. A tissue handling transfer apparatus for receiving tissue clips in a machine direction and for selectively transferring and positioning said clips suitable for flat or boutique packaging in containers, said handling transfer apparatus comprising:

a bucket conveyor comprising a plurality of bi-level product buckets for receiving and transferring tissue clips having a predetermined length and width, in a machine direction, toward containers;

said product buckets each having a flat upper level at least as long as and as wide as the length of the tissue clips, and a lower level comprised of a full-width transverse channel in said upper level from one side of each bucket to the other and whose width is greater than the width of the tissue clips but less than the length of the tissue clips;

wherein said tissue clips are received on the upper level of said buckets with the length of said clips oriented in the machine direction spanning said transverse channel; and further including apparatus for selectively turning said clips 90 degrees for positioning and orienting said clips on the lower level within said transverse channel for packaging flat packs of tissues, and for selectively leaving said clips unturned on the upper level spanning said transverse channel for packaging boutique packs of tissues.

* * * * *